Jan. 16, 1940.   E. J. STORY   2,187,636
WEAR COMPENSATING DEVICE
Filed May 16, 1938
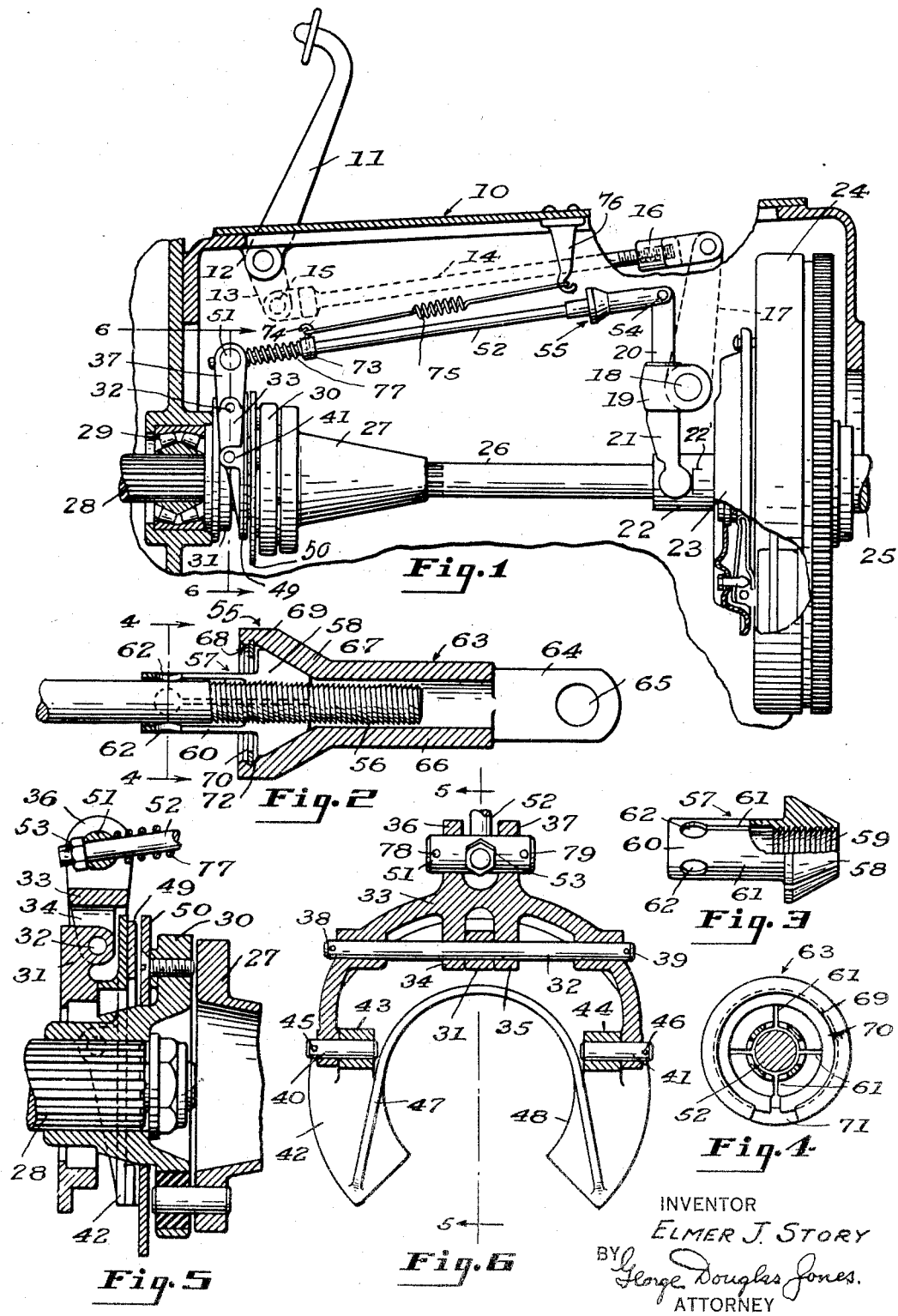
INVENTOR
ELMER J. STORY
BY George Douglas Jones.
ATTORNEY Patented Jan. 16, 1940

2,187,636

UNITED STATES PATENT OFFICE 2,187,636

WEAR COMPENSATING DEVICE

Elmer J. Story, East Cleveland, Ohio, assignor to The Cleveland Tractor Company, Cleveland, Ohio Application May 16, 1938, Serial No. 208,308

8 Claims. (Cl. 192—18)

The present invention relates to a wear compensating unit for automatically taking up the lost motion in a linkage, which lost motion may be due to wear in the linkage connections or in the members which they operate.

A practical embodiment, which is disclosed herein, includes a manually operable clutch pedal or lever for a vehicle transmission and a brake, operated simultaneously with movement of the clutch pedal, to control rotation of the transmission gear trains.

It is a principal object of the invention to interpose suitable means between the clutch pedal and transmission brake automatically to compensate for wear incident to use.

More specifically, an inventive object is the provision of a self-tightening screw-threaded joint on a rod for operating the brake.

With the above and other objects and features in view, the invention will now be described with respect to the accompanying drawing and pointed out in the claims.

In the drawing, Fig. 1 is a fragmentary side elevation, partly in section, of an automotive transmission, showing the relation of the invention thereto;

Fig. 2 is a detailed longitudinal section of the wear compensating device;

Fig. 3 is a side elevation, partly in section, of an element of the wear compensating device;

Fig. 4 shows a transverse section of the device, looking in the direction of the arrows on section line 4—4 of Fig. 2;

Fig. 5 is a longitudinal section of the brake mechanism shown in Fig. 1, taken on the section line 5—5 of Fig. 6; and Fig. 6 represents a transverse section of the brake mechanism, at line 6—6 of Fig. 1.

In the embodiment of the invention illustrated in the drawing, 10 indicates the forward portion of a transmission housing which carries at its top a clutch pedal or lever arm 11 pivoted on a boss 12 fixed inside the housing for operating mechanism which will be described. Another lever arm 13, rotating with the clutch pedal 11 has a rod 14 pivotally connected to its free end by means of a lug 15. A sleeved lug 16 is in adjustable threaded engagement with the other end of rod 14; and pivotally connects it to the end of a crank or lever 17 which rotates a crankshaft 18.

Rotation of the crankshaft 18 will produce oscillation of a sleeve-like arm 19 which is in sliding engagement with a link or rod 20 having a yoke 21 on its lower end for shifting (to the right) the sleeve 22 of a conventional clutch indicated generally as 23 and having abutting relation with a projecting portion 22' of the sleeve.

The clutch 23 is movable into and out of frictional driving engagement with a flywheel 24 on the end of an engine crankshaft 25. A clutch shaft 26 carries the clutch sleeve 22 at one end and a clutch shaft coupling spider 27 on the other end. At the rear or left hand end of the transmission housing 10 as seen in Fig. 1, a driven or transmission shaft 28 is supported in a self-aligning bearing 29. Secured and keyed to the end of shaft 28 is a transmission shaft coupling spider 30 which is coupled to the clutch shaft spider 27 in the manner shown by Figs. 1 and 5.

In Fig. 5 is shown a ring-shaped member 31, fixed to the housing 10 and encircling part of the transmission shaft spider 30, the purpose of which is to mount a pivot pin 32 transversely of the various shafts.

A yoke 33 (Fig. 6) is pivotally supported by pin 32 which passes through its sides and a pair of inwardly extending lugs 34, 35 integral with said yoke. From the center of yoke 33, a pair of parallel lugs 36 and 37 extend upwardly for a purpose which will be described subsequently. Cotter pins 38 and 39 pass through the ends of pivot pin 32 and serve to retain the yoke 33 in place.

By means of a pair of co-axial, opposed pivot pins 40 and 41, a transmission brake plate 42 of inverted U-shape is connected to the yoke 33 through a pair of apertured lugs 43, 44 integral with the plate 42, one on each leg of the U. The pivot pins 40 and 41 are secured in the lugs 43 and 44, respectively; cotter pins 45 and 46 are used to hold the yoke 33 on the projecting ends of said pivot pins (Fig. 6).

A boss of 47 of inverted U-shape and semi-circular at the middle reinforces a circular notch 48 in the clutch brake plate 42. The notch 48 encircles a part of the spider 30. A brake lining 49 of corresponding outline is secured to the face of brake plate 42 in the manner illustrated by Fig. 5.

A co-operating brake lining 50 of circular shape is secured to the transmission shaft spider 30 in opposed relation to the lining 49 which is reciprocable with the plate 42, but non-rotatable.

Referring again to the lugs 36 and 37 of yoke 33, it will be seen in Fig. 6 that a pivot pin 51 passes through them parallel to the other yoke pins 32, 40, 41. The pin 51 is drilled transversely midway of its length slidably to receive a clutch brake rod 52, having a nut 53 threaded on its end to retain it in said pin (Fig. 5).

At the other end, the brake rod 52 is pivotally joined to the upper end of link 20 by a pivot pin 54 and a wear compensating device designated generally as 55.

The end of the brake rod 52 which engages the wear compensating device 55 is provided with a buttress threaded portion 56 (Fig. 2). A collet 57 which has a frusto-conical head 58 and internal buttress threads 59 extending partially into an integral sleeve portion 60, as shown in Fig. 3, receives the end of rod 52.

Fig. 2 indicates the complemental nature of the rod threads 56 and collet threads 59.

Four slits 61 extend longitudinally of the collet 57 from the top of the head 58 nearly to the end of sleeve 60; they are arranged to divide the collet 57 into quadrants. To prevent splitting of the sleeve 60, each slit terminates in a circular hole 62. Any number of similar slits which will provide an operative split nut construction may be utilized.

The collet head 58 is enclosed by a housing 63 having a yoke 64 at one end with drilled holes 65 to receive the pin 54 which connects the rod 52 and wear compensating device 55 to the rod 20 operated by the clutch pedal 11. A conically bored portion or socket 67 of the housing 63 receives the collect head 58; the portion 67 is complemental to the head 58 which has a sliding fit therein.

At the end remote from yoke 64 the housing 63 terminates in a second cylindrically bored portion 68 forming an extension of the socket part 67. A circular groove 69 in the cylindrical portion 68 is intended to hold in place a contractable retaining ring 70 in the form of a split washer. To facilitate removal of the retaining ring 70, a longitudinal slot 71 of appreciable width is cut in the bottom of the second cylindrical portion 68, as seen in Fig. 4; it extends inward to the groove 69.

When the head 58 of the collet 57 is in threaded engagement with the end of brake rod 52 (Fig. 2) there is a predetermined space 72 between the base of said head and the ring 70 by which it is retained in the housing 63. If this space (72) is closed, as when the head 58 abuts the ring 70, the threaded rod 52 can move to the left relative to the collet 57 of Fig. 2. Such movement will be without relative rotation of rod 52 and collet 57, because the latter will be in an expansible position with respect to the conically bored portion 67 which ordinarily serves to clamp it to the rod.

It will be necessary to refer to several additional parts in order to make the automatic operation of this invention clear. A collar 73 is secured near the brake end of the rod 52; it is provided with a hook 74 which secures one end of a tension spring 75. The other end of the spring 75 engages a hooked member 76 which depends within the forward end of the transmission housing 10. A compression spring 77 encircles rod 52 between the collar 73 and the pivot pin 51 which engages the brake yoke 33. Cotter pins 78 and 79 may be provided at the ends of said pin 51 to maintain the rod 52 midway of the lugs 36 and 37.

The compression spring 77 will produce a resilient brake pedal action of progressively increasing resistance. Together with the tension spring 75, it will act to return the pedal 11 and to release the transmission brake as soon as the clutch 23 commences to move into engagement with the flywheel 24.

As initially adjusted, the collet head 58 will be in firm engagement with its socket, the conically bored portion 67; and wedged thereby so as to clamp the buttress threads 56 of the brake rod 52. Ordinary wear of the frictional driving members (not shown) of clutch 23 will require that the clutch sleeve 22 be permitted to shift to the left along the shaft 26 of Fig. 1 in order that said clutch may be engaged with the same pressure as before the wear occurred.

The tension spring 75 is constructed and arranged so as to pull the rod 52 to the right in Fig. 1 until the nut 53 is stopped by the pivot pin 51 (Fig. 5). After this point is reached, further movement of the rod 20 clockwise, in response to the leftward shifting of the clutch sleeve 22 as previously explained, will cause the collet housing 63 to move away from the collet 57 which is threaded to the rod 52. However, it will be remembered that this latter relative movement is limited by the retaining ring 70 to the space 72. When sufficient wear has taken place in the clutch, the buttress threads 56 of rod 52 will be released by the collet head 58 and be free to slide therepast, as the collet housing 63 continues its previously described movement. The effective length of the brake rod 52 will thus be increased until the collet 67 is pushed back into tight engagement with its socket 57 and into clamping engagement with a portion of the unescaped threads (56). No further extension will then take place, and the interengaged buttress threads can again transmit power in one direction, namely to the left or in a brake-applying direction.

Finally, it is noted that the spring action which is inherent in the construction of clutch 23 will, through the rod 20, insure relative motion of the collet housing 67 and rod 52 when the transmission brake is in released position and when appreciable wear has increased the clearance between the frictional members of the clutch.

Having thus described my invention, what I claim as new and desire to secure by Letters Patent of the United States is:

1. The combination comprising a rotating brake lining element, a fixed brake lining element opposed to the rotating one, a clutch for controlling movement of the rotating brake lining element, and mechanism including a brake rod and an operating lever for moving the brake elements into and out of operative engagement and for disengaging the clutch as the brake elements are moved into engagement and for engaging the clutch as the brake elements are moved out of engagement, and means connected to said brake rod for increasing automatically its effective length in response to clutch wear.

2. A wear compensating device, comprising a tubular housing, a split collet fitting in one end of the housing, and a split, removable ring for retaining the collet in the housing, said collet being threaded internally to engage a similarly threaded end of a brake rod.

3. A wear compensating unit which comprises an operating rod threaded on one end, a split collet in threaded engagement with said rod, a tubular housing having a socket at one end for receiving the collet and means at the other end for connecting it to a lever or rod, and contractable means for retaining the collet within the housing.

4. A wear compensating unit comprising, in combination, a rod having buttress threads at one end; a split collet internally threaded to receive the buttress threads of the rod, said collet having a sleeve portion and an enlarged frusto-conical head which contains threads throughout its length; a tubular housing for receiving the collet and any portion of the threaded end of the rod which extends beyond the collet head, said housing having means at one end for connecting it to a pin and a conical socket adjacent its other end complemental to the head of the collet; and a split, removable ring which encircles the sleeve portion of the collet and engages the housing within its conical end to retain the head of the collet therein.

5. A wear compensating device which includes: a split collet having internal threads and a frusto-conical head, a housing member having a conical socket portion at one end which is complemental to and receives the frusto-conical head of the collet, and a split, removable retaining ring engaging the socket near its outer end at a distance from the collet head when the latter is at its limit of inward movement, so as to permit relative movement between the housing member and collet.

6. A wear compensating device comprising a split collet, a housing member having a socket portion at one end which is complemental to and receives an end of the collet, and a split retaining ring, said socket portion having an internal groove near its entrance for holding the ring in position and a longitudinal slot extending inwardly from said entrance to said groove to facilitate removal of said ring.

7. In combination, a reciprocable clutch, a clutch shaft secured to a portion of said clutch for rotation therewith, a brake for controlling rotation of the clutch shaft, operating means for the clutch and shaft including a rod connected to the clutch and brake, and a lever for simultaneously reciprocating the clutch and moving the rod, and a wear compensating device associated with the rod for automatically varying the length of the rod in response to wear of the clutch, whereby the clutch may be engaged with substantially the same pressure as before wear occurred.

8. In an automatic wear compensating unit, the combination comprising a rod provided at one end with buttress threads and movable longitudinally; means including a conical-socketed member and a split collet for receiving the threaded end of the rod, the socketed member and the collet being complementally shaped and normally in engagement, and the collet being threaded to retain the buttress threads of the rod; and a contractable, removable means for retaining the collet in the socketed member, said removable means being sufficiently spaced from the portion of the collet which it is adapted to abut that the socketed member and the collet may move relatively to release the latter from the threaded portion of the rod, and thus vary the effective length of said rod by permitting the rod and collet to move relatively and then into clamping engagement with each other at a different location.

ELMER J. STORY.